July 19, 1966  B. KAZAN  3,262,010
ELECTRICAL DISPLAY APPARATUS INCORPORATING ELECTROLUMINESCENT
AND GAS DISCHARGE DEVICES
Filed Aug. 31, 1960  3 Sheets-Sheet 1

Benjamin Kazan,
*INVENTOR.*
BY.

*AGENT.*

Benjamin Kazan,
INVENTOR.
BY.
AGENT.

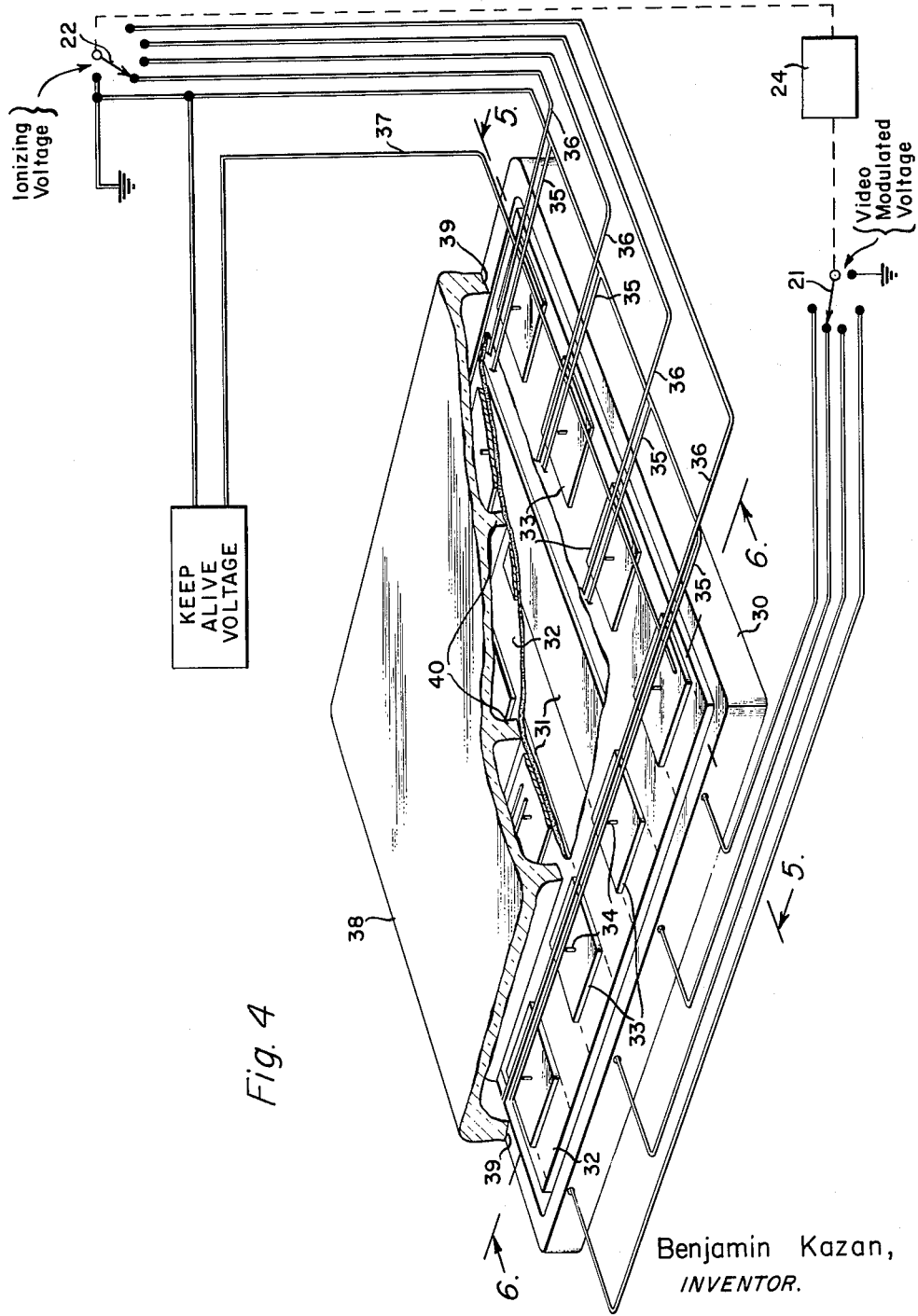

United States Patent Office 3,262,010
Patented July 19, 1966

3,262,010
ELECTRICAL DISPLAY APPARATUS INCORPORATING ELECTROLUMINESCENT AND GAS DISCHARGE DEVICES
Benjamin Kazan, Los Angeles, Calif., assignor to Hughes Aircraft Company, Culver City, Calif., a corporation of Delaware
Filed Aug. 31, 1960, Ser. No. 53,109
12 Claims. (Cl. 315—63)

This invention relates generally to electrical switch devices and circuits therefor for switching and controlling electrical loads and to arrangements of such electrical switch devices and circuits with individual electrical loads for the purpose of signal conversion.

According to one of its aspects, this invention is directed to an electrical switch device and circuit of the electronic type for switching and modulating the supply of electrical energy to an electrical load.

In another of its aspects this invention is directed to an electrical switch device affording switching of one or more independent electrical circuits from a single control element.

In still another of its aspects, this invention is directed to an information converter or display device controlled by electrical signals.

A particular structural embodiment of this invention is of particular utility in the field of electrical displays wherein electrical energy is supplied to a single light producing device or individually to such light producing devices in an array such as a matrix for the purpose of converting electrical signals into light. In this connection, the present invention contemplates the selective switching and, if desired, modulation of the electrical energy supplied to such devices for the purpose of forming various electrical displays including the production of images such as pictures from electrical signals.

Although in the reproduction of pictures, this invention is not limited to any particular type of light producing device, one type which offers certain desirable advantages is that which employs a phosphor material which may be caused to luminesce in the presence of an applied electric field, and which may be caused to vary in brightness by variation in the strength of the electric field. The phenomenon of producing light by such means is known in the art as electroluminescence. More particularly, such phosphor material may be mounted together with suitable electrodes for applying electric fields thereto, upon a suitable substrate to form a panel comprised effectively of discrete electroluminescent cells controlled in such a way as to produce light in a point-by-point, line-by-line fashion so as to permit the formation of a desired image which may be pictorial.

Considerable effort has been devoted to light producing devices which are essentially solid state in an effort to provide a display device that is relatively flat or shallow in depth. Much of this effort has been centered around the phenomenon of electroluminescence whereby light is produced by an electroluminescent phosphor which is disposed in an electric field established by means of a pair of electrodes between which the phosphor is sandwiched. In such an arrangement one of the electrodes is usually light transparent to permit the light produced by the phosphor to be observed. The phenomenon of electroluminescence is quite well known and detailed explanation thereof is not deemed to be necessary for the purposes of explaining the present invention.

To utilize the phenomenon of electroluminescence in the formation of images or pictorial displays, as for television, it is necessary that the light output of individual picture elements or cells be individually controlled. A common technique is to selectively activate these elements in time sequence. This process will be referred to herein as "scanning" but it should be understood that the physical movement of an electron beam across a phosphor surface as in a cathode ray tube is not involved in the electroluminescent devices contemplated herein.

It has been proposed heretofore that scanning of an electroluminescent panel may be accomplished by employing a pair of grids, each comprising electrical conductors with the electroluminescent phosphor material disposed between the conductors in one grid (which extend in a first direction) and the conductors in the second grid (which extend in a direction at right angles to the direction of the conductors in the first grid). Thus an electrical potential between one conductor in one grid and a conductor in the second grid establishes an electrical field across the phosphor in the region of the intersection of the two conductors which have been selected. Ideally a spot of light may be formed at any selected inersection on the face of the panel and scanning may be accomplished by sequentially switching the applied potential from one conductor to another.

While the switching problems involved in this type of electroluminescent display device are substantial, the chief undesirable feature of the cross grid panel is the lack of good contrast. The contrast in such a panel is poor because it is virtually impossible to localize or restrict the electric field, or, its effect, to a single point, or, sufficiently small area on the panel defined at and immediately about a single intersection of conductors. Considerable light is additionally produced at other intersections because of the distribution of the applied potential along coordinate conductors.

In order to avoid this difficulty it has further been proposed to add photoconductive elements in series with the phosphor elements and to illuminate successive groups of photoconductive elements simultaneously with the selection of the electroluminescent cell or cells, thus reducing the light output of unselected elements. Some of the difficulties with this scheme are that an auxiliary, complex, high intensity, light scanning arrangement must be provided and the rate at which successive elements can be selected is severely limited by the decay time of the photoconductive material.

One object of this invention is to provide an electrical switching device and circuit for switching and modulating the supply of electrical energy to an electrical load.

Another object of this invention is to provide an electrical switching device affording switching of one or more independent electrical circuits from a single control element.

A further object of this invention is to provide an improved information display arrangement controlled by electrical signals.

Yet another object of this invention is to provide an improved electroluminescent display panel.

It is also an object of this invention to provide an improved electrical display panel having minimum depth.

Further to the preceding objects, it is an object of this invention to provide an improved electrical display panel of shallow depth which may be used for producing pictures corresponding to input electrical signals.

A still further object of this invention is to provide an improved electrical display panel having good contrast.

Still a further object of this invention is to provide an electrical display panel which does not require an electron beam or electron beam scanning.

Yet another object of this invention is to provide an improved electrical display panel of the type having small discrete light producing areas wherein provision is made for rapid switching of electrical energy among said light producing areas.

The aforesaid and other objects and advantages are accomplished according to one general embodiment of this invention in an electrical display panel including an array of elemental electroluminescent cells arranged as a matrix and controlled individually between energized and deenergized conditions by respective switches connected in series with each such cell. The arrangement includes provisions for modulating the electrical energy supplied to each such cell.

Operatively such a switch may be a gas tube comprising a pair of main electrodes between which electron flow may occur when the gas in the tube is ionized. An ionizing or selecting electrode operatively associated with one of the two main electrodes, is employed to ionize the gas in the tube. A selecting or ionizing potential is applied between the said one main electrode and said ionizing electrode to ionize the gas in the region between the latter two electrodes. Some of the ions and free electrons so produced diffuse into the space between the two main electrodes so that conductivity is established therebetween. If voltage is applied or exists across the main electrodes, conduction takes place between the main electrodes. When the ionizing voltage is cut off, conduction between the main electrodes ceases, assuming the voltage across the main electrodes is below the voltage needed to sustain breakdown between the main electrodes.

Such a tube functions effectively as an electric switch connected in series with the cell to open and close the energizing circuit for the cell and, hence, switch the cell between energized or light producing and deenergized or dark conditions. Due to the rapid action of such a gas tube, this arrangement provides fast switching of the associated electroluminescent cell between energized and deenergized electrical conditions. By maintaining the ionizing voltage on the ionizing electrode, it is possible to utilize main electrode voltages below the voltage needed to sustain breakdown therebetween. Consequently, it is physically possible to vary the voltage across the main electrodes and so modulate the voltage or current applied to any particular light producing device, such as an electroluminescent cell, to cause the light output to vary.

According to one concept of an elemental cell unit herein, the electroluminescent cell is connected in series in the circuit supplying voltage to the main electrodes of the gas tube so that conduction of the tube produces current flow in the cell, producing light.

The concept of an elemental cell unit may also be realized by combining the electroluminescent layer with a gas tube, say, within the tube envelope. The electroluminescent material may be deposited upon a transparent conducting back plate electrically connected to one main electrode. Again when the tube is ionized by the ionizing electrode with voltage maintained across the main electrodes current flows through the electroluminescent layer, producing light.

Individual such cell units may be connected in the configuration of a matrix to form a panel for electrical display purposes, each cell acting as a picture element. In such an arrangement, for picture production from electrical signals, rows of the unit cells may be connected in parallel between a common ground and a separate conducting lead. Each lead is connected to a commutator which sequentially applies voltage to the successive leads. The selecting or ionizing electrodes are connected in groups to other leads forming rows of ionizing electrodes running at right angles to the first mentioned rows.

In operation, pictures may be produced as follows:

(1) Ionizing voltage is applied to the ionizing electrodes of a given horizontal row through the commutator switch for a specific time.

(2) During this time, a second commutator switch applies voltage, row by row, to the rows of main electrodes of the unit cells, causing light emission sequentially from the phosphor element associated with a selected unit cell in each row. No light is emitted from phosphor elements associated with other rows of unit cells that have not been selected. During the switching of successive horizontal rows of ionizing electrodes the magnitude of the voltage applied to the main electrodes of the unit cells can be modulated in accordance with a time varying video input signal, for instance, thus controlling the amount of light from individual energized phosphor elements.

(3) Repeat this procedure for each horizontal row of ionizing electrodes. By scanning the complete array in this manner, a picture is produced. Alternatively, or, in addition, the ionizing voltage supply may be modulated by a video signal to control the brightness of the individual elements.

An electroluminescent display screen, according to a particular embodiment of this invention, may comprise a suitable transparent electrical insulating substrate, such as glass, on which transparent electrical conducting strip electrodes are placed in suitably spaced parallel relationship. An electroluminescent phosphor material of predetermined thickness extends over the substrate and the transparent conducting strips. Small plate electrodes of electrical conducting material are positioned in rows at right angles to the direction of the strip electrodes, each plate electrode being positioned on the electroluminescent material over or in alignment with a strip electrode. The small plate electrodes effectively define a matrix affording discrete areas roughly bounded by the size of the plate electrode, in which electroluminescence may occur when voltage is applied across the electroluminescent material by application of voltage across a selected plate electrode and the associated strip electrode. The electrical isolation afforded by the use of an individual switch for each of the small plate electrodes, prevents current flow through unselected phosphor elements or areas and improves contrast. Electrodes forming part of switch assemblies for selecting particular plate electrodes for energization are mounted on the same side of the panel as the plate electrodes. This side of the panel is enclosed by a cover which is sealed around its edges to the substrate. The space between the cover and the panel is filled with an ionizable gas at suitable pressure.

The switch assemblies each include a common electrode for each row of plate electrodes. This common electrode may be a narrow rod or wire, for instance, extending the length of a row of the plates at right angles to the strip electrodes, in a position spaced a predetermined distance from each of the plate electrodes, or, from an electrode projecting from each of the plate electrodes. This common electrode is a main electrode. The ionizing electrode may similarly be a rod or a wire, substantially coextensive with the main electrode and spaced therefrom a predetermined distance and adapted to receive an ionizing potential to ionize the gas, to provide conducting paths between the main electrode and its adjacent rows of plates. In the arrangement here described, the energizing voltage is applied to a particular strip electrode with respect to ground, all of the main electrodes being grounded.

Improved physical isolation among the respective adjacent horizontal rows of plate electrodes, is derived from an arrangement in which the cover enclosing the back of the screen and the electrodes is supported intermediate the horizontal rows of plate electrodes. This latter structural concept may be achieved by providing ridges projecting from the cover and contacting the phosphor surface intermediate the rows of plates. By this means, ions generated along one row of plate electrodes are prevented from diffusing to adjacent rows. At the same time the rib structure provides a stronger, light weight enclosure capable of supporting atmospheric pressure.

The aforesaid and other objects and advantages will be more apparent from a study of the following specification when considered in conjunction with the accompanying drawings in which:

FIG. 4 is an isometric drawing schematically representing an electroluminescent type of display panel or screen, embodying the principles of this invention, and showing the electrical control connections therefor for various display purposes including picture reproduction;

Figure 1:
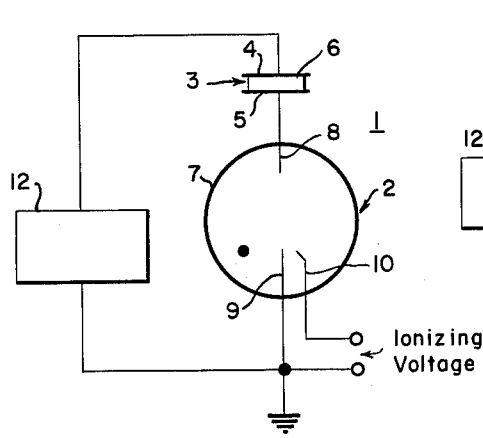
FIG. 1 depicts an elemental cell unit embodying the principles of this invention.

The present invention inheres the concept of an electroluminescent display device comprised effectively of discrete electroluminescent cells which are individually selectively switched and modulated between energized and deenergized conditions. An elemental cell unit 1 is depicted in FIG. 1 wherein an electroluminescent cell generally designated 3 is connected in series with a suitable switch, in this instance, a gas tube, generally designated 2. The electroluminescent cell 3 comprises a pair of electrodes 4 and 5, one or both of which may be transparent, disposed upon opposite sides of, say, an electroluminescent phosphor material 6, which when suitably energized by a voltage applied to the plates 4 and 5, is capable of producing light. The gas tube 2 comprises an envelope 7 and respective main electrodes 8 and 9 which are properly spaced. An ionizing electrode 10 is disposed adjacent main electrode 9. During the time that ionization current is maintained between electrodes 9 and 10, ions diffuse into the space between the main electrodes providing a conducting path between them. Under this condition the voltage between the main electrodes can be much below that required to sustain ionization. The source of energizing voltage 12 for the main electrode circuit is here represented only in block form, but may be any suitable A.C. or D.C. voltage source required for the operation. In an arrangement of the type herein contemplated, wherein numbers of such elemental cell units are arranged in a suitable matrix, such an energizing voltage may be a suitable video modulated source. Modulating the voltage in the main electrode circuit varies the light output of the electroluminescent cell 3 during the time that ionization is sustained by the ionizing electrode. Of course, variations of the voltage or current appled to the electroluminescent cell or other load impedance in the main electrode circuit of the tube, may also be achieved by modulating the ionizing electrode voltage as required.

Figure 2:
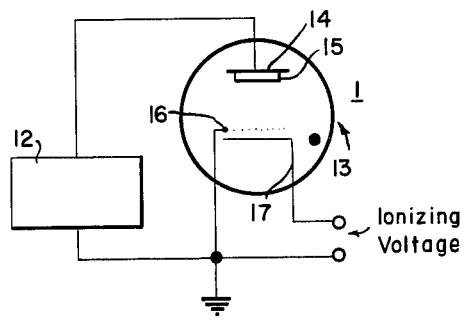
FIG. 2 is a modification of the elemental cell unit of FIG. 1, also embodying the principles of this invention.

In the embodiment of the invention illustrated in FIG. 2, again depicting an electroluminescent cell unit 1, the electroluminescent material 15 is disposed within the envelope of a gas tube generally designated 13. In this arrangement at least part of the envelope is transparent. The tube again comprises a pair of main electrodes and an ionizing electrode. In this instance, however, one main electrode may have mounted thereon a suitable plate 14, constituting one main electrode and having disposed thereon a suitable thickness of, say, electroluminescent phosphor material 15. The other main electrode may be as in FIG. 1, or may be of any suitable type, such as a screen mesh or wire grid 16. Again, an ionizing electrode 17 is disposed adjacent the main electrode 16, but not directly in the space between the main electrodes, to effect ionization of the gas within the tube upon the application of an ionizing potential thereto. Here also the voltage supply for the main electrode circuit is designated 12 and may be A.C. or D.C. as described in connection with FIG. 1. As in FIG. 1, and depending upon the requirements of the particular circuit in which the elemental cell construction is to be employed, one of the main electrodes may be grounded. In this instance, the electrode 16 is grounded to provide a common circuit connection. Either or both the main electrode circuit and the ionizing voltage circuit may be modulated to provide modulation of the current of voltage applied to the electroluminescent cell.

There are several ways in which the electroluminescent phosphor may be incorporated in the tube assembly illustrated. One is to provide a glass embedded type of phosphor powder which is disposed upon the plate electrode 14. Another way in which the phosphor may be included would be to embed the phosphor material in a transparent plastic binder so that the phosphor material itself is not directly exposed to the ion and electron bombardment within the tube. Still another way is to cover the exposed phosphor surface with a conducting layer such as metal.

Figure 3:
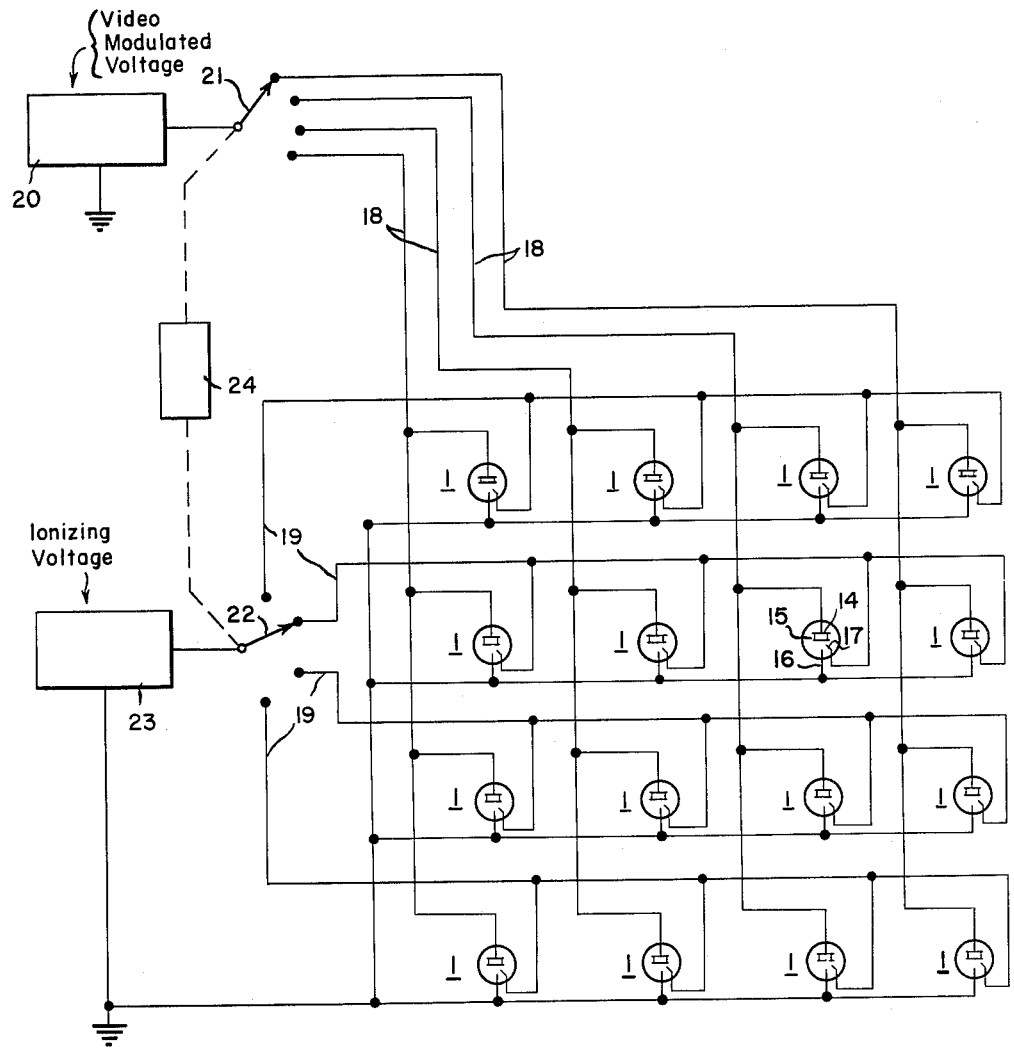
FIG. 3 is a diagrammatical illustration of an array of elemental cell units of the type shown in FIG. 2, suitable for various types of electrical displays including picture reproduction.

In FIG. 3 the elemental cell units are connected in an electrical network and are disposed in a physical arrangement providing an electrical display device capable of producing various types of electrical displays. The elemental cell units depicted in FIG. 3 are each the same as that represented in FIG. 2 hereof. However, it will be appreciated that the cell units of the type of FIG. 1 may be directly substituted for those shown. Energizing voltage is applied to rows of elemental cell units which individually comprise a tube including the phosphor material therewithin, to provide vertical rows, as shown, of cell units in which the circuits in the respective vertical rows are connected in parallel to individual main electrode circuits 18. Similarly, the ionizing electrodes 17 of each particular horizontal row of elemental cell units are connected in parallel by individual ionizing electrode circuits 19.

If pictures are to be displayed on such an arrangement the panel may be controlled in a manner similar to the conventional cathode ray tubes. However, in place of the conventional cathode ray beam which sweeps the cathode ray tube horizontally in successive vertical steps, a switching arrangement is now provided which sweeps or switches a supply of voltage from one main electrode circuit or vertical row to the next across the array. This voltage in this instance may be a video modulated voltage, providing the required energizing voltage for each main electrode circuit of the elemental cell units. Here again, as described in connection with both FIGS. 1 and 2, the main electrode circuit energizing voltage may be below that required to sustain ionization within the tube. Such a voltage circuit is identified as a video modulated voltage source represented in block form and identified by reference character 20. The output of this voltage source 20 is applied through a commutator switch 21 which steps the video modulated voltage from one vertical row of main electrode circuits to the other across the panel, to thereby sweep the video modulated voltage across the panel.

During this period an ionizing supply voltage 23 is connected to one of the ionizing or selecting electrode circuit rows by means of a commutator switch 22. The sweep of the commutator switch 21 will, of course, be synchronized with the video modulated voltage input to provide a synchronized application of video signals stepwise across the screen. Similarly the operation of commutator switch 22 is synchronized by suitable means, mechanical or electrical, here represented as a block 24, with the operation of switch 21, whereby switch 22 steps from one of its switch positions to the next in a particular sequence, once each full sweep of commutator switch 21, until all horizontal rows have been scanned. In this process each successive electroluminescent element is modulated by the video modulated voltage to provide a complete picture  Alternatively, a video modulated voltage may be applied to the horizontal rows of ionizing electrodes instead of the main electrode circuits. By controlling ionization at a video rate, the flow of current in the main electrode circuit is correspondingly controlled.

There are still other ways in which the arrangement of FIG. 3 may be controlled. One worth noting here incorporates a video modulated voltage source which simultaneously presents all of the video modulated voltages for the several vertical circuit rows each time a horizontal circuit row is energized. By this expedient all of the vertical lines or circuits are energized at once each time a horizontal line or circuit is selected. As in the arrangement illustrated in FIG. 3, the right amount of signal is again applied to each vertical line, the only difference being that instead of the successive application of the signals to each vertical line the signals are applied to all of the vertical lines at once in synchronism with the successive selection of the horizontal ionizing electrode circuits.

Regardless of which of the methods of switching is employed, the unit cell structure and the circuit organizations herein described provide electrical isolation among the unit cells so that only the cell or cells selected are energized. The unselected cells are actually open circuited. Coupling capacitance, which in conventional arrangements coupled cells other than a selected cell to the energizing potential is extremely low in the present arrangements. As a consequence, in the arrangements herein, contrast is materially improved.

Figure 5:
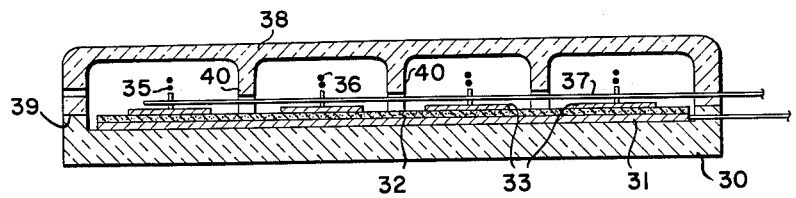
FIG. 5 is a sectional view taken along the line 5—5 of FIG. 4.
Figure 6:
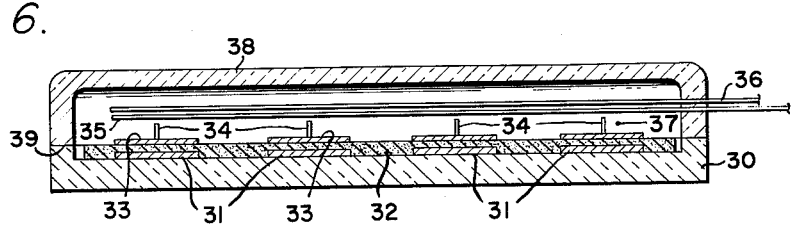
FIG. 6 is a sectional view taken along the line 6—6 of FIG. 4.

The embodiment of the invention illustrated in FIGS. 4, 5 and 6 inheres all of the advantages of a panel embodying discrete electroluminescent cells in an array constituting a matrix, without loss of electrical isolation between the elemental cell units. Such a structure also enables the design of a high resolution structure with small cell elements.

This assembly comprises a transparent electrical insulation substrate or support 30, such as glass, upon which a plurality of transparent, electrical conducting, strip electrodes 31 of a material such as tin oxide, are disposed in substantially regularly spaced parallel relationship. An electroluminescent phosphor layer 32 of predetermined thickness is disposed over the transparent substrate 30 and the strip electrodes 31. Rows of regularly spaced plate electrodes 33 are disposed on the exposed face of the electroluminescent layer 32, in registration with the strip electrodes 31 in positions also forming rows extending substantially at right angles to the direction of the strip electrodes. Each plate electrode assembly is provided with a projecting electrode 34. An elongated electrode 35, which is one of the main electrodes, and which in this application functions as a grounded electrode, extends across each row of plate electrodes in a position spaced a predetermined distance from the ends of the projecting electrodes 34. An elongated ionizing electrode 36, which may also be termed a selecting electrode, is substantially coextensive with the grounded main electrode 35, in each instance, and is also spaced a predetermined distance therefrom. A keep-alive electrode 37 extends at right angles to the rows of plate electrodes, that is, in the direction of the strip electrodes, for example, in a position beneath the grounded main electrodes 35. This entire assembly is enclosed by a cover 38 which is sealed at all four of the edges 39 of the display device. Cover 38 forms a vacuum tight container completely enclosing the electrode assembly. The volume enclosed by the cover is filled with a gas, such as argon, or neon, at some predetermined appropriate pressure, usually below atmospheric pressure.

Rigidity of this assembly is achieved, in this instance, by the provision of ribs 40 disposed between the horizontal rows of plate electrodes and extending to and, if desired, contacting the back face of the electroluminescent phosphor layer 32 to prevent the cover from collapsing if a low pressure gas filling is used. This arrangement, in addition to providing mechanical rigidity which is highly desirable, also serves to isolate the gas discharge associated with each row of plate electrodes.

As will be seen by reference to FIG. 4, the electrical circuits externally of this device are simplified in that the parallel arrangement of the switches internally of the back cover eliminates the necessity for such connection externally of the device. The respective external circuits may simply be connected to respective taps or terminals of suitable switching devices for achieving the desired selection of the respective discrete areas of the screen, for the application of electrical potentials. In this instance, it will be seen the video modulated voltage is applied through a commutator switch 21 and the ionization supply voltage is supplied through a commutator switch 22. Here again, switch 22 is synchronized with switch 21 by any suitable means 24 so that switch 22 steps one position for each complete cycle of operation of the video signal switch 21.

Although mechanical types of commutator switches have been herein illustrated, it will be appreciated that any type of switch may be employed for this purpose including electronic types.

The keep-alive electrode 37 may be maintained at some suitable fixed or average voltage level affording ionization with respect to the main electrodes to provide a small degree of ionization in the region of each adjacent main electrode 35. This greatly reduces the jitter and the time delay in the build up of ionization between an ionizing or selecting electrode and its main electrode, enabling higher speeds of operation and more reproducible results. As will be seen by reference to FIGS. 4, 5 and 6, the ionizing electrodes 36, in each instance, are disposed in positions removed from the gap between the grounded main electrodes 35 and the projecting electrodes 34. Here, as in connection with the previously described embodiments, the ionizing voltage is preferably sufficient to provide ionization within each tube section in a degree affording ion diffusion into the gap between the grounded main electrodes and the projecting electrodes 34. The video modulated voltage applied in the main electrode circuits may be below the level required to sustain ionization of the tubes. Additionally, if desired, the modulation by video means may be applied to the ionizing or selecting electrodes to achieve essentially the same results. Under still other circumstances, it may be desirable to modulate both the ionizing and the main electrode circuit voltages.

Although the arrangement herein described utilizes plate electrodes 33 to roughly describe the discrete electroluminescent cells, that is, the areas which will luminesce upon the application of an electric current or voltage to the main electrode circuit, it is to be understood that such plate electrodes may be varied in size, depending upon the size of the spot which is desired. If an extremely small spot is desired, for instance, these electrodes may be eliminated entirely and the grounded electrode 35 in each instance positioned so that the spacing between it and the layer of phosphor material is such as to provide tube operation. In this latter arrangement, if desired, the grounded electrode may be bent to provide projections therefrom pointed towards the back face of the phosphor layer at each point where a cell is to be described. In such a situation, as described in connection with FIG. 2, a protective insulating layer may be disposed on the back face of the phosphor layer.

In one physical embodiment of a multi-element switch based on the same principle as the structural arrangement of the type illustrated in FIGS. 4, 5 and 6, an evacuated envelope filled with argon gas under about 1 millimeter of pressure was provided with a plurality of projecting electrodes distributed along its length in suitably spaced relationship. These projecting electrodes were of tungsten and were about 20 mils in diameter. A first elongated electrode of tungsten wire about 30 mils in diameter was disposed longitudinally of the tube in a position spaced about 40 mils from the ends of the projecting electrodes. This electrode functioned as a grounded main electrode. A second elongated electrode also of tungsten wire about 30 mils in diameter was disposed in parallel with the grounded main electrode, spaced about 40 mils therefrom and on the side opposite to that of the projecting electrodes. This second electrode was coextensive with the grounded main electrode and functioned as the ionizing or selecting electrode. An electroluminescent cell was connected to one of the projecting electrodes and an alternating current supply of about 300 volts and 5000 cycles per second was connected between the electroluminescent cell and ground. With no voltage applied to the ionizing or selecting electrode, the phosphor element or electroluminescent cell remained off. However, when a voltage pulse was applied to the ionizing electrode of approximately 500 volts and 1 millisecond in duration, all of the projecting electrodes simultaneously became electrically connected to the grounded main electrode during this millisecond due to the low impedance of the ionized gas. Also, the phosphor element connected to one of the projecting electrodes lit up during the pulse, going off after the pulse. This assembly also included a keep-alive electrode sspaced about 40 mils from the grounded main electrode. Improvements were noted in the speed of switching when a D.C. voltage was maintained on the keep-alive electrode. This direct current voltage was of the order of 400 to 500 volts, which maintained a small gas discharge between it and the grounded main electrode. With the D.C. keep-alive voltage applied, the starting time of conductivity between the projecting electrodes and the main electrode after initiation of the pulse on the ionizing or selecting electrode became very much shorter than when the keep-alive voltage was not applied. The measured time was less than 1 microsecond for the build up of conductivity after the selection or ionizing electrode pulse was applied. The actual sizes of wires to be selected, the type of wires, the spacing of these wires, the type of gas filling and its pressure will vary depending upon the application. Similarly, depending upon the physical parameters of the tube construction the magnitudes of the voltages applied for the main electrode circuits, the ionizing or selecting electrode circuit and the keep-alive electrode circuit will vary.

Although other methods of operation may be utilized, it is preferred to operate the switching devices herein in such a manner that rapid switching may be obtained while at the same time permitting modulating the load circuits of the devices. To this end, it is preferred that the switching devices have applied to the ionizing or selected electrodes thereof voltages of sufficient magnitude to effect ionization of the gas within the tube and diffusion of ions and free electrons into the main electrode path in which case the main electrode's circuit voltage may be lower than that which is required to sustain ionization in the tube. This arrangement provides, therefore, for the simultaneous application of the ionizing or selecting electrode voltage with the main electrode circuit voltage or stated otherwise the application of both the ionizing and the main electrode circuit voltages in such a way that for the control required these will be on together for a period of time. As pointed out herein, with this method of operation the main electrode voltage may be a suitable video modulated signal, whence, any load impedance connected in the main electrode circuit will be correspondingly modulated. In still another mode of operation, modulation may be achieved by modulating the ionizing voltage or selecting electrode voltage while maintaining this voltage at all times at a sufficiently high level to provide the degree of ionization required to sustain operation of the tube. Either of the modes of operation here described will be suitable for producing pictures from electrical signals. It is to be understood, however, that this invention also contemplates the possibility of modulating both the main electrode circuit voltages and the ionizing or selecting electrode circuit voltages.

From the foregoing description, it will be appreciated that there has been provided an electrical switch device and circuit therefor for switching and modulating the supply of electrical energy to an electrical load, including provisions for switching one or more independent electrical circuits from a single control element and providing facilities for information displays under the control of electrical signals.

The improved arrangements herein described afford extremely rapid switching of an electrical load, such as an electroluminescent cell, for instance, or a plurality of such cells to provide a structural arrangement capable of producing pictures from electrical signals, such as video modulated signals, and affording high resolution and improved contrast.

It will be appreciated by those skilled in the art that modifications of this invention may be made in its details. For instance, while particular arrangements of gas discharge tubes have been described herein, it will be appreciated that other organizations of such tubes may be utilized together with other and different control circuits therefor to provide switching in any desired pattern. Similarly, modifications may be made in the construction of a display panel with reference to the details of the panel laminates and their arrangement, and also with reference to the structure of the gas switching tubes.

What is claimed is:

1. An electrical display panel, comprising: a transparent electrical insulating member; a plurality of spaced substantially parallel transparent conducting strip electrodes disposed on one face of said member; a layer of electroluminescent material disposed over said one face; a plurality of electrical plate electrodes arranged in rows extending at an angle to said strip electrodes, the plate electrodes of the respective rows being individually aligned with respective strip electrodes in positions spaced from said strip electrodes and in electrical contact with the exposed face of said electroluminescent material; an elongated electrode extending along each row of said plate electrodes in spaced relation therewith; an ionizing electrode associated with said elongated electrode; and means enclosing said exposed face and the electrodes thereat in an ionizable gaseous medium.

2. Apparatus as recited in claim 1 including an electrode extending transversely of all of said elongated electrodes.

3. An electrical display panel, comprising: a transparent electrical insulating support; a plurality of spaced, substantially parallel, transparent, electrical conducting strip electrodes disposed on one face of said member; a layer of electroluminescent material disposed on said one face over said electrodes; a plurality of plate electrodes arranged in rows extending at an angle to said strip electrodes, the plate electrodes of the respective rows being individually aligned with respective strip electrodes in positions electrically contacting said electroluminescent material; a gas discharge device at each row of plate electrodes including a main electrode spaced a predetermined distance from said plate electrode and an ionizing electrode substantially coextensive with and spaced from said main electrode, and means providing a gaseous atmosphere at each discharge device.

4. An electrical display panel, comprising: a transparent electrical insulating support; a plurality of spaced, substantially parallel, transparent, electrical conducting strip electrodes disposed on one face of said member; a layer of electroluminescent material disposed on said one face over said electrodes; a plurality of plate electrodes arranged in rows extending at an angle to said strip electrodes, the plate electrodes of the respective rows being individually aligned with respective strip electrodes in positions electrically contacting said electroluminescent material, a gas discharge device at each row of plate electrodes including a main electrode spaced a predetermined distance from said plate electrodes and an ionizing electrode substantially coextensive with and spaced from said main electrode, an additional electrode extending substantially transversely of the other electrodes and adapted to be maintained at a potential differing from that of said main electrode and cooperating with said main electrode to provide electrical discharge of predetermined amount, and means providing a gaseous atmosphere at each gas discharge device.

5. Apparatus as recited in claim 3 wherein said last named means includes a cover plate covering the side of said panel on which said plate electrodes are mounted, said cover being at least marginally sealed to said panel and forming a cavity enclosing said electrodes; and a gaseous medium within said cavity.

6. Apparatus as recited in claim 3 wherein said last named means includes a cover plate covering all of said electrodes in a position spaced therefrom and being at least marginally sealed to said panel; said panel having inwardly projecting ribs between said rows of plate electrodes, contacting said electroluminescent material, forming individual cavities along each row of plate electrodes; and a gaseous medium filling each cavity.

7. Electrical switch apparatus, comprising: a gas tube having a plurality of independent main electrodes; a common main electrode disposed in spaced relation to each of said plurality of independent main electrodes; an ionizing electrode disposed adjacent said common main electrode in a position removed from the paths between said common main electrode and each of said independent main electrodes; and a keep-alive electrode disposed adjacent said common main electrode in a position removed from the paths between said common main electrode and each of said independent main electrodes.

8. An electrical display panel, comprising: a transparent electrical insulating support; a plurality of spaced, substantially parallel, transparent, electrical conducting strip electrodes disposed on one face of said member; a layer of electroluminescent material disposed on said one face over said electrodes; a plurality of plate electrodes arranged in rows extending at an angle to said strip electrodes, the plate electrodes of the respective rows being individually aligned with respective strip electrodes in positions electrically contacting said electroluminescent material; a gas discharge tube at each row of plate electrodes including a main electrode spaced a predetermined distance from said plate electrodes and an ionizing electrode substantially coextensive with and spaced from said main electrode; means applying an ionization sustaining voltage to said ionizing electrode; and means applying a voltage to at least one of said strip electrodes and said main electrode of a level below that required to sustain ionization.

9. An electrical light producing device, comprising:
a gaseous discharge device having a pair of main electrodes;
a plate secured to one of said pair of main electrodes;
a layer of electroluminescent material disposed on said plate;
a protective cover disposed over at least a portion of said layer of electroluminescent material in a position to protect said electroluminescent material at least from direct ion and electron bombardment;
and an ionizing electrode disposed adjacent the other of said pair of main electrodes.

10. Apparatus as set forth in claim 9 in which said protective cover comprises a metal layer.

11. Apparatus as set forth in claim 9 in which said electroluminescent material is a glass-embedded electroplastic binder and said protective cover comprises said transparent plastic binder.

12. Apparatus as set forth in claim 9 in which said electroluminescent material is a glass-embedded electroluminescent phosphor and said protective cover comprises said glass.

References Cited by the Examiner

UNITED STATES PATENTS

| | | | |
|---|---|---|---|
| 1,807,177 | 11/1931 | Schmierer | 313—189 |
| 1,984,877 | 12/1934 | Jobst et al. | 315—169 X |
| 1,985,096 | 12/1934 | Imaoka. | |
| 2,039,637 | 5/1936 | Dimond. | |
| 2,136,441 | 11/1938 | Karolus | 315—169 |
| 2,437,365 | 3/1948 | Thomas. | |
| 2,500,929 | 3/1950 | Chilowsky | 315—169 |
| 2,556,704 | 12/1951 | Parkinson. | |
| 2,612,617 | 9/1952 | Hagen | 313—189 |
| 2,774,813 | 12/1956 | Livingston | 315—169 |
| 2,796,558 | 6/1957 | Koehler | 315—169 |
| 2,846,610 | 8/1958 | Dass et al. | 315—108 |
| 2,858,480 | 10/1958 | Shadowitz | 315—169 |
| 2,876,374 | 3/1959 | Riggen | 315—108 |
| 2,889,481 | 6/1959 | Stieritz. | |
| 2,925,530 | 2/1960 | Engelbart | 315—169 |
| 2,933,648 | 4/1960 | Bentley | 315—169 |
| 2,965,801 | 12/1960 | Archer | 315—169 |
| 2,972,707 | 2/1961 | Wood | 315—169 |
| 3,013,182 | 12/1961 | Russell | 315—169 |
| 3,042,823 | 7/1962 | Willard | 315—169 |

JAMES W. LAWRENCE, *Primary Examiner.*

RALPH G. NILSON, ARTHUR GAUSS, GEORGE N. WESTBY, *Examiners.*

C. R. CAMPBELL, *Assistant Examiner.*